United States Patent
Lu et al.

(10) Patent No.: US 11,722,423 B2
(45) Date of Patent: Aug. 8, 2023

(54) DATA FLOW CLASSIFICATION DEVICE

(71) Applicant: REALTEK SEMICONDUCTOR CORPORATION, Hsinchu (TW)

(72) Inventors: Kuo-Cheng Lu, Hsinchu (TW); Min-Chang Wei, Hsinchu (TW); Chun-Ming Liu, Hsinchu (TW); Kuang-Yu Yen, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 33 days.

(21) Appl. No.: 17/466,299

(22) Filed: Sep. 3, 2021

(65) Prior Publication Data
US 2022/0231955 A1 Jul. 21, 2022

(30) Foreign Application Priority Data
Jan. 19, 2021 (TW) .................................. 110101901

(51) Int. Cl.
*H04L 47/2441* (2022.01)
*H04L 47/32* (2022.01)
*H04L 47/62* (2022.01)

(52) U.S. Cl.
CPC .......... *H04L 47/2441* (2013.01); *H04L 47/32* (2013.01); *H04L 47/62* (2013.01)

(58) Field of Classification Search
CPC ...... H04L 47/32; H04L 47/62; H04L 47/2441
See application file for complete search history.

(56) References Cited

U.S. PATENT DOCUMENTS

| | | | |
|---|---|---|---|
| 10,917,352 B1* | 2/2021 | Hanes | H04L 69/16 |
| 2015/0071072 A1* | 3/2015 | Ratzin | G06F 9/544 |
| | | | 370/235 |
| 2015/0271081 A1* | 9/2015 | Arumilli | H04L 47/32 |
| | | | 370/235 |
| 2016/0261510 A1* | 9/2016 | Burnette | H04L 47/29 |
| 2017/0118090 A1* | 4/2017 | Pettit | H04L 67/10 |
| 2019/0109787 A1* | 4/2019 | Chen | H04L 47/11 |
| 2019/0158415 A1* | 5/2019 | Pan | H04L 47/6255 |
| 2019/0356593 A1* | 11/2019 | Nikolaidis | H04L 45/38 |
| 2020/0014486 A1* | 1/2020 | Harrang | H04L 1/1671 |
| 2022/0006737 A1* | 1/2022 | Chang | G06F 16/906 |
| 2022/0166691 A1* | 5/2022 | Johnson | H04L 43/024 |

* cited by examiner

*Primary Examiner* — Melanie Jagannathan
(74) *Attorney, Agent, or Firm* — WPAT, P.C

(57) ABSTRACT

Disclosed is a data flow classification device including a forwarding circuit and a configuring circuit. The forwarding circuit looks the classification of an input flow up in a lookup table according to the information of the input flow, tags the packets of the input flow with the classification, and outputs the packets to a buffer circuit. The configuring circuit receives and stores the identification and traffic information of multiple flows, and accordingly calculates the traffic of the multiple flows, wherein the multiple flows include the input flow. The configuring circuit further determines an elephant flow threshold according to a queue length of the buffer circuit and a target length, determines the classifications of the multiple flows according to the comparison between the traffic of the multiple flows and the elephant flow threshold, and stores these classifications in the lookup table.

19 Claims, 12 Drawing Sheets

DATA FLOW CLASSIFICATION DEVICE

BACKGROUND OF THE INVENTION

1. Field of the Invention

The present disclosure relates to a classification device, especially to a data flow classification device.

2. Description of Related Art

Bufferbloat means that a forwarding device (e.g., a network switch) excessively buffers packets and thereby causes the occurrence of high latency and delay variation in a network. Bufferbloat is usually tackled with the following three manners:
(1) Queue scheduling under class of service (CoS): This manner classifies packets, associates different classifications of the packets with different queues, and then assigns different classes of service to the different queues according to a scheduling algorithm.
(2) Active queue management (AQM): This manner does not classify packets, but discards a part of the packets according to a probability before a queue is full of the packets so that an average queue length of the queue can be reduced.
(3) Weighted AQM: This manner classifies packets and assigns different packet discard rates to different classifications of the packets so as to preferentially discard packets of low transmission priority and reserve buffer space for packets of high transmission priority.

However, it is difficult to properly classify packets. The most common manner is to classify packets according to user setting; however, this manner is not convenient to users and hard to classify packets properly. The aforementioned AQM manner can reduce the average queuing delay; however, since this manner does not classify packets, packets of high transmission priority and packets of low transmission priority will be discarded by the same probability, and this affects the throughput of the packets of high transmission priority (e.g., Voice over Internet Protocol (VoIP) packets, realtime video stream packets, gaming packets) and user experience.

SUMMARY OF THE INVENTION

An object of the present disclosure is to provide a data flow classification device capable of preventing the problems of the prior art.

An embodiment of the data flow classification device of the present disclosure includes a forwarding circuit and a configuring circuit. Each of the forwarding circuit and the configuring circuit can be realized with hardware or realized with hardware executing software and/or firmware.

The forwarding circuit includes a first storage circuit, a classification circuit, and a data flow information acquiring circuit. The first storage circuit is configured to store a lookup table which stores the identification information of multiple data flows and the classifications of the multiple data flows. The classification circuit is coupled with a data flow input and the first storage circuit, and configured to receive a first data flow from the data flow input and search the identification information of the multiple data flows in the lookup table for the first identification information of the first data flow. On condition that the first identification information is included in the lookup table, the classification circuit determines the classification of the first data flow according to the classifications of the multiple data flows included in the lookup table and outputs the first data flow to a buffer circuit. On condition that the first identification information is not included in the lookup table, the classification circuit treats the classification of the first data flow as a predetermined classification and outputs the first data flow to the buffer circuit. The data flow information acquiring circuit is configured to acquire at least a part of the first data flow to obtain and output the first identification information and the first traffic information of the first data flow.

The configuring circuit includes a second storage circuit, an elephant-flow traffic threshold adjustment circuit, and a classification decision circuit. The second storage circuit is coupled to the data flow information acquiring circuit, and configured to store a data flow information table which stores the identification information of the multiple data flows and the traffic information of the multiple data flows, in which the identification information of the multiple data flows includes the first identification information and the traffic information of the multiple data flows includes the first traffic information. The elephant-flow traffic threshold adjustment circuit is coupled to the buffer circuit, and configured to determine an elephant-flow traffic threshold according to the variation in a relation between a target queue state (e.g., target queue length or target queuing delay) and a current queue state (e.g., current queue length or current queuing delay) of the buffer circuit. The classification decision circuit is coupled to the elephant-flow traffic threshold adjustment circuit, the second storage circuit, and the first storage circuit, and configured to determine the classifications of the multiple data flows stored in the lookup table of the first storage circuit according to the variation in a relation between the traffic information of the multiple data flows and the elephant-flow traffic threshold.

In light of the above, the embodiment classifies more/fewer data flows under an elephant flow classification by the control of the elephant-flow traffic threshold, so that the buffer circuit can prevent bufferbloat in a manner of lowering the transmission priority of an elephant flow or preferentially discarding packets of the elephant flow.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present specification discloses a data flow classification device capable of classifying multiple data flows according to the comparison between the traffic of the multiple data flows and an elephant-flow traffic threshold. When a queue state (e.g., queue length or queuing delay) of a back-end buffer circuit is longer (or shorter) than a target threshold, the data flow classification device of the present disclosure can lower (or raise) the elephant-flow traffic threshold correspondingly so as to classify more (or fewer) data flows under an elephant flow classification, which allows the back-end buffer circuit to prevent bufferbloat in a manner of lowering the transmission priority of an elephant flow or preferentially discarding packets of the elephant flow. The data flow classification device is applicable to a network packet forwarding device (e.g., a network switch); in such applications, data flows are composed of continuous packets and/or discontinuous packets. For better understanding, the following description is based on a network packet forwarding application, but the application of the present invention is not limited thereto.

Figure 1:
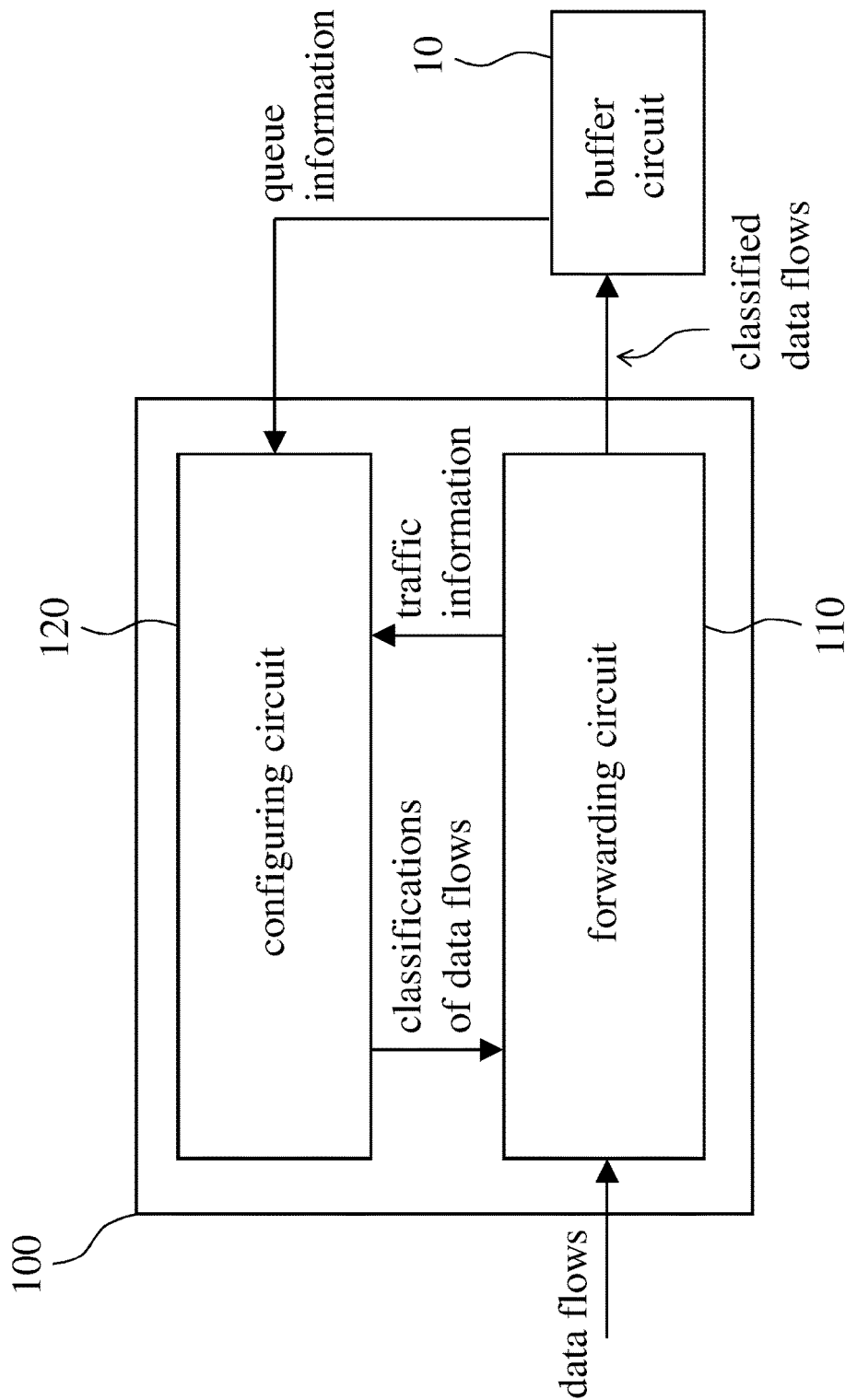
FIG. 1 shows an embodiment of the data flow classification device of the present disclosure.

FIG. 1 shows an embodiment of the data flow classification device of the present disclosure. The data flow classification device 100 of FIG. 1 includes a forwarding circuit 110 and a configuring circuit 120. The forwarding circuit 110 is configured to receive and classify a data flow and then forward the classified data flow to a buffer circuit 10. The forwarding circuit 110 is further configured to provide the traffic information of the data flow for the configuring circuit 120. The configuring circuit 120 is configured to determine the classification of the data flow according to the queue information of the buffer circuit 10 and the traffic information of the data flow, and then provide the classification of the data flow for the forwarding circuit 110. Each of the forwarding circuit 110 and the configuring circuit 120 can be realized with hardware or realized with hardware executing software and/or firmware.

Figure 2:
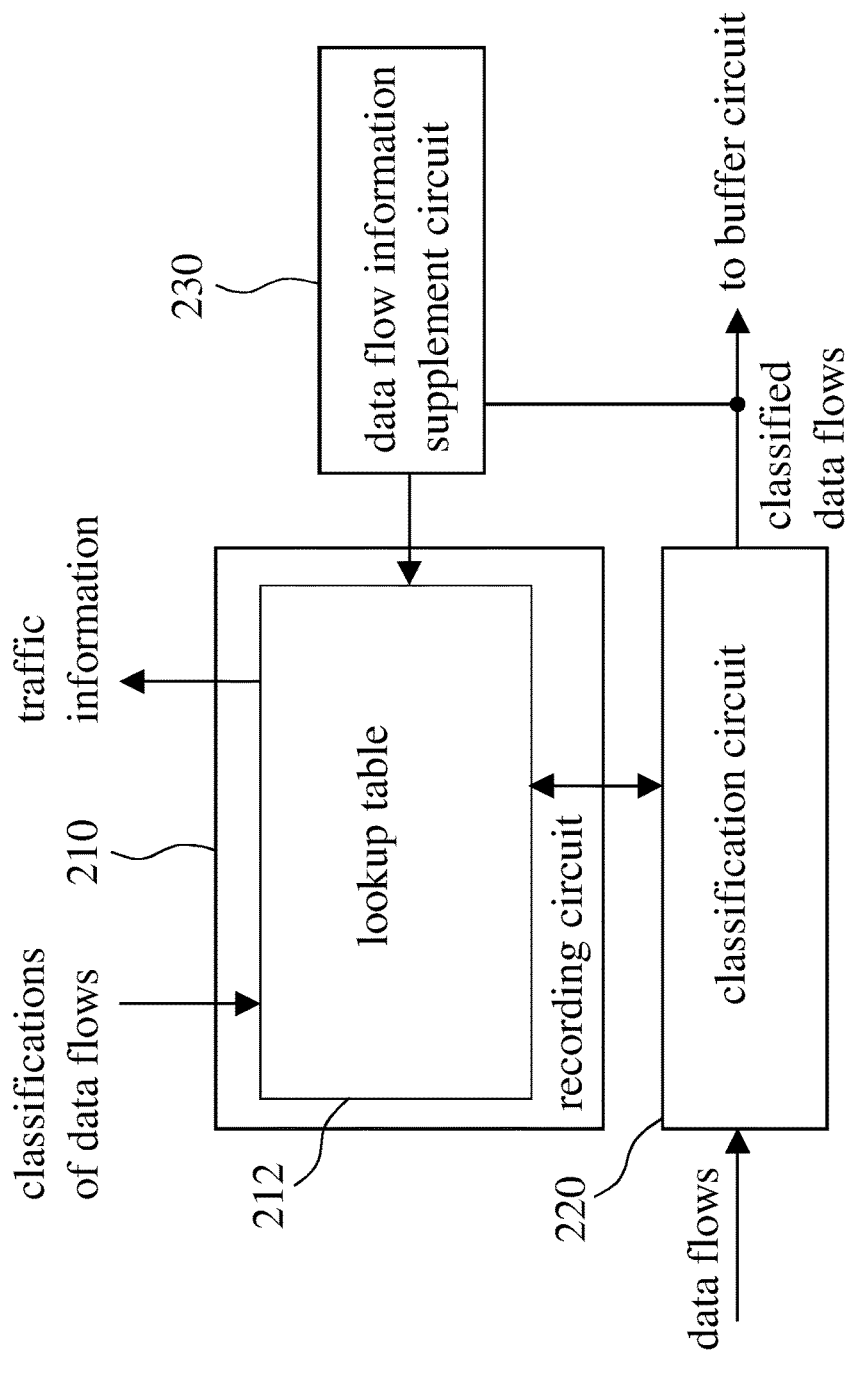
FIG. 2 shows an embodiment of the forwarding circuit of FIG. 1.

FIG. 2 shows an embodiment of the forwarding circuit 110 of FIG. 1. The forwarding circuit 110 of FIG. 2 includes a recording circuit 210, a classification circuit 220, and a data flow information supplement circuit 230. The recording circuit 210 and the classification circuit 220 can optionally be integrated into one circuit (e.g., a lookup table circuit), but the implementation of the present invention is not limited thereto.

Referring to FIGS. 1-2. The recording circuit 210 is configured to calculate the traffic of each of the multiple data flows and thereby obtain the traffic information of the multiple data flows. For example, the recording circuit 210 determines the identification of a data flow according to the identification information of the data flow, and then calculates the packet number and/or the byte number of the data flow to obtain the traffic information of the data flow. The recording circuit 210 further includes a lookup table 212, wherein the term "include" here can be interpreted as "store". The lookup table 212 includes the identification information of the multiple data flows, the traffic information of the multiple data flows, and the classifications of the multiple data flows, wherein the term "include" here can be interpreted as "store". In an exemplary implementation, the identification information of each of the multiple data flows is a set of values. For example, the set of values is a 5-tuple including a destination Internet Protocol (IP) address, a source IP address, a protocol, a destination port, and a source port, but the implementation of the present invention is not limited thereto. Providing an implementation of the present invention is practicable, any information that can be used as the identification of a data flow can be the identification information in this implementation. Since the calculation of the aforementioned packet number/byte number and the implementation of the aforementioned lookup table can be realized with known or self-developed technologies, their details are omitted here.

Referring to FIGS. 1-2. The classification circuit 220 is coupled to a data flow input (i.e., the source of the arrow labeled with "data flows" in the figures) and the recording circuit 210, and configured to receive a first data flow from the data flow input and then search the identification information of the multiple data flows in the lookup table 212 for the first identification information of the first data flow, wherein the term "first" here is for description convenience rather than implementation limitation and thus the first data flow can be any data flow from the data flow input. When the lookup table 212 includes the first identification information, the lookup table 212 logically includes the classification of the first data flow related to the first identification information; accordingly, the classification circuit 220 can determine the classification of the first data flow with the lookup table 212 and then output the classified first data flow to the buffer circuit 10. When the lookup table 212 does not include the first identification information, the classification circuit 220 classifies the first data flow under a predetermined classification and then outputs the classified first data flow to the buffer circuit 10. It is noted that when the lookup table 212 does not include the first identification information, the classification circuit 220 may make the data flow information supplement circuit 230 to acquire at least a part of the first data flow from the output of the classification circuit 220 (e.g., the arrow labeled with "classified data flow" in the figures) or from the data flow input by means of sending a notification signal to the classification circuit 220 or other known/self-developed manners (e.g., the control of one or more switch(es) for passing/blocking the transmission of the at least a part of the first data flow); therefore, the data flow information supplement circuit 230 can optionally update the lookup table 212 according to the at least a part of the first data flow. It is also noted that the buffer circuit 10 of FIG. 1 can be integrated into the data flow classification device 100 or independent of the data flow classification device 100.

In an exemplary implementation, the classifications of the multiple data flows stored in the lookup table 212 include an elephant flow classification and a non-elephant flow (e.g., a mouse flow) classification. Normally, the traffic of any data flow classified under the elephant flow classification is higher than the traffic of any data flow classified under the non-elephant flow classification. In regard to the operation of the buffer circuit 10, an elephant flow transmission priority assigned to the elephant flow classification is lower than a non-elephant flow transmission priority assigned to the non-elephant flow classification, or an elephant flow packet discard rate in connection with the elephant flow classification is higher than a non-elephant flow packet discard rate in connection with the non-elephant flow classification; and the aforementioned predetermined classification is the non-elephant flow classification. In an exemplary implementation, the elephant flow classification includes a first classification and a second classification; the traffic of any data flow classified under the first classification is higher than the traffic of any data flow classified under the second classification; and in regard to the operation of the buffer circuit 10, a first transmission priority assigned to the first classification is lower than a second transmission priority assigned to the second classification, or a first packet discard rate in connection with the first classification is higher than a second packet discard rate in connection with the second classification. The elephant flow classification may include more sub-classifications according to the demand for implementation.

In an exemplary implementation, each packet of the first data flow includes the first identification information. The classification circuit 220 is configured to search the identification information of the multiple data flows stored in the lookup table 212 for the first identification information. When the lookup table 212 already stores the first identification information, the lookup table 212 logically stores the classification of the first data flow; accordingly, the classification circuit 220 can tag each packet of the first data flow with the classification of the first data flow stored in the lookup table, and then the buffer circuit 10 can ascertain the classification of a packet (i.e., the elephant flow classification or the non-elephant flow classification) according to its tag. In an exemplary implementation, the classification circuit 220 tags a packet with its classification by means of determining the value of a metadata (e.g., color-narrative metadata) of each packet of the first data flow. Since tagging a packet can be realized with a known/self-developed technology, the details are omitted here.

Referring to FIGS. 1-2. The data flow information supplement circuit 230 is coupled with the recording circuit 210 and the classification circuit 220. When the lookup table 212 does not include the first identification information, the data flow information supplement circuit 230 acquires at least a part of the first data flow from the output of the classification circuit 220 or from the data flow input so as to obtain the first identification information of the first data flow; afterward, the data flow information supplement circuit 230 adds the first identification information to the lookup table 212 as a part of the identification information of the multiple data flows. In addition, the recording circuit 210 calculates the traffic of the first data flow to obtain the first traffic information of the first data flow and adds it to the lookup table 212 as a part of the traffic information of the multiple data flows. If the lookup table 212 is full before the addition of the first identification information and the first traffic information, the data flow information supplement circuit 230 can remove the information of a data flow (e.g., the data flow determined according to a Least Recently Used (LRU) algorithm) stored in the lookup table 212, but the implementation of the present invention is not limited thereto. In an exemplary implementation, in consideration of the limited size of the lookup table 212, the data flow information supplement circuit 230 performs a sample operation according to a predetermined probability (e.g., P %, wherein P is a number between 0 and 100); accordingly, a probability of the data flow information supplement circuit 230 acquiring the at least a part of the first data flow is equal to the predetermined probability, which implies that the data flow information supplement circuit 230 does not sample every data flow and record its identification and traffic information. Since the sample operation and the operation of acquiring specific information of a packet can be realized with known/self-developed technologies, their details are omitted here.

Figure 3:
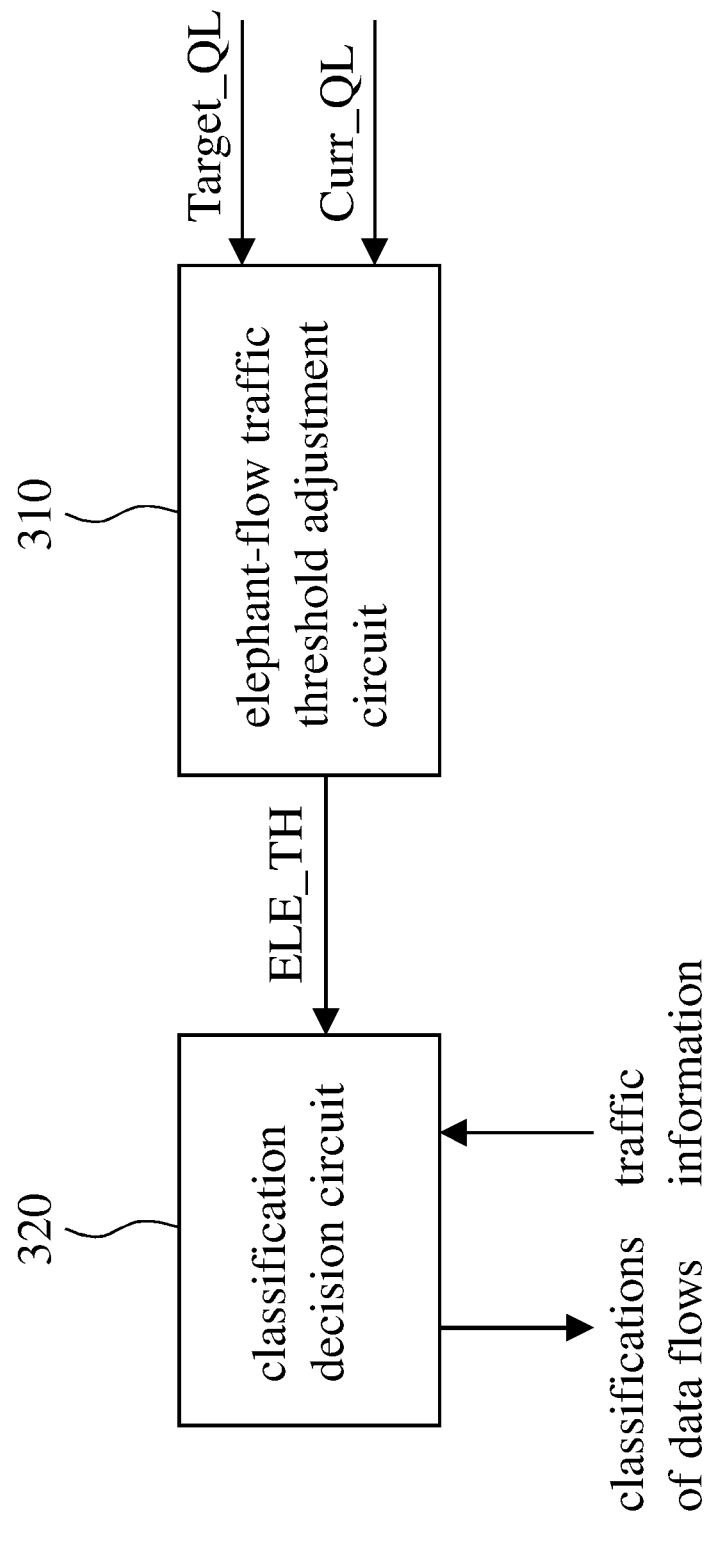
FIG. 3 shows an embodiment of the configuring circuit of FIG. 1.

FIG. 3 shows an embodiment of the configuring circuit 120 of FIG. 1. The configuring circuit 120 of FIG. 3 includes an elephant-flow threshold adjustment circuit 310 and a classification decision circuit 320.

Referring to FIGS. 1-3. The elephant-flow traffic threshold adjustment circuit 310 is coupled to the buffer circuit 10 and configured to determine an elephant-flow traffic threshold (ELE_TH) according to the variation in a relation between a target queue state (e.g., constant queue length or constant queuing delay) and a current queue state of the buffer circuit 10 (e.g., variable queue length or variable queuing delay); in other words, the elephant-flow traffic threshold may vary with the current queue state. In an exemplary implementation, after the current queue state (Curr_QL) is superior to the target queue state (Target_QL) N time(s), the elephant-flow traffic threshold adjustment circuit 310 determines that the buffer circuit 10 changes from a non-congestion state to a congestion state as illustrated with FIGS. 4-5, and the elephant-flow traffic threshold adjustment circuit 310 lowers the elephant-flow traffic threshold at least one time so as to find out more data flows that could be elephant flows; accordingly, the buffer circuit 10 can discard at least a part of the elephant flow(s) to relieve the congestion. The term "be superior to" in this specification can be interpretated as "exceed" or "be worse than", and the above-mentioned "N" is a positive integer (e.g., an integer greater than one).

Figure 4:
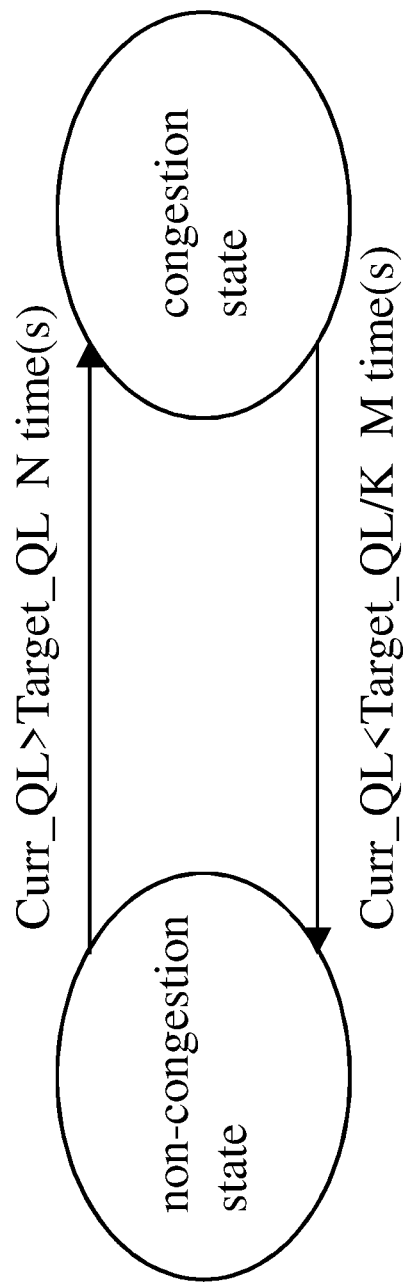
FIG. 4 shows an embodiment of how the elephant-flow traffic threshold adjustment circuit of FIG. 3 determines the state of the buffer circuit.

In an exemplary implementation, packets classified under different classifications are allocated to the same queue of the buffer circuit 10, and the buffer circuit 10 can adopt a known/self-developed weighted active queue management (Weighted AQM) technology to discard the packets in the queue by a probability. In a circumstance that the buffer circuit 10 is in the congestion state, after the current queue state is inferior to one-$K^{th}$ of the target queue state M time(s), the elephant-flow traffic threshold adjustment circuit 310 determines that the buffer circuit 10 returns to the non-congestion state (as shown in FIG. 4) and then raises the elephant-flow traffic threshold at least one time, so as to reduce a probability of a data flow being classified under the elephant flow classification. The term "be inferior to" in this specification can be interpreted as "do not exceed" or "be better than", and both the above-mentioned "K" and "M" are positive integers (e.g., integers greater than one) determined according to the demand for implementation.

In an exemplary implementation, packets classified under different classifications are allocated to different queues of the buffer circuit 10, and the buffer circuit 10 can adopt a known/self-developed Class of Service (CoS) queue scheduling technology to assign different classes of service to different queues respectively. The buffer circuit 10 includes a non-elephant flow buffer queue and at least one elephant flow buffer queue (e.g., a first elephant flow buffer queue and a second elephant flow buffer queue, wherein the first elephant buffer queue has a lower transmission priority or a higher packet discard rate in comparison with the second elephant flow buffer queue); the current queue state is a current queue state of the non-elephant flow buffer queue (e.g., CurrG_QL of FIG. 5); a non-elephant flow transmission priority assigned to the non-elephant flow buffer queue is higher than any elephant flow transmission priority assigned to the at least one elephant flow buffer queue, or a non-elephant flow packet discard rate in connection with the non-elephant flow buffer queue is lower than any elephant flow packet discard rate in connection with the at least one elephant flow buffer queue. In a circumstance that the buffer circuit 10 is in a congestion state, after each current queue state of the at least one elephant flow buffer queue (e.g., CurrY_QL and CurrR_QL in FIG. 5) is inferior to one-$K^{th}$ of the target queue state M time(s), the elephant-flow traffic threshold adjustment circuit 310 determines that the buffer circuit 310 returns to a non-congestion state and then raises the elephant-flow traffic threshold at least one time, so as to reduce a probability of a data flow being classified under the elephant flow classification. Both the above-mentioned "K" and "M" are positive integers (e.g., integers greater than one) determined according to the demand for implementation. It is noted that the setting of the "N time(s)", "M time(s)", and "one-$K^{th}$" in the embodiments of this specification is used to control the sensitivity of the elephant-flow traffic threshold adjustment circuit 310 to the congestion/non-congestion state of the buffer circuit 10, and can prevent the state of the buffer circuit 10 from changing frequently; in brief, the setting can be determined according to the demand for implementation flexibly.

Figure 6:
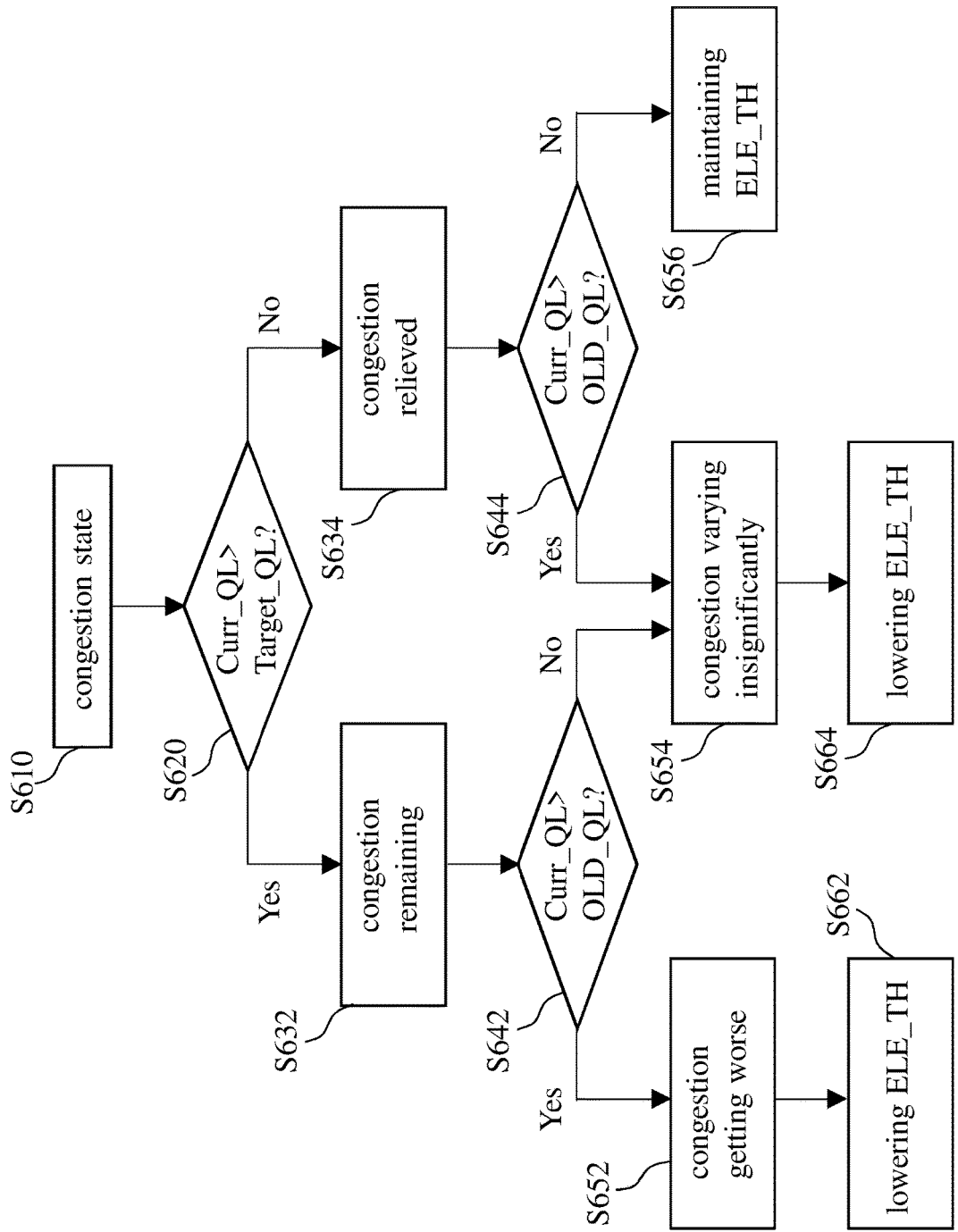
FIG. 6 shows an embodiment of how the elephant-flow traffic threshold adjustment circuit of FIG. 3 adjusts the elephant-flow traffic threshold.

FIG. 6 is a flow chart showing an embodiment of how the elephant-flow traffic threshold adjustment circuit 310 adjusts the elephant-flow traffic threshold (ELE_TH). The steps of FIG. 6 are described below, and can be repeated according to the demand for implementation.

S610: The elephant-flow traffic threshold adjustment circuit 310 determines that the buffer circuit 10 is in a congestion state.

S620: The elephant-flow traffic threshold adjustment circuit 310 determines whether the current queue state (Curr_QL) is superior to the target queue state (Target_QL); if the result is YES, the elephant-flow traffic threshold adjustment circuit 310 performs step S632; and if the result is NO, the elephant-flow traffic threshold adjustment circuit 310 performs step S634.

S632: The elephant-flow traffic threshold adjustment circuit 310 determines that the congestion state is not relieved and therefore performs step S642.

S634: The elephant-flow traffic threshold adjustment circuit 310 determines that the congestion state is relieved and therefore performs step S644.

S642: The elephant-flow traffic threshold adjustment circuit 310 determines whether the current queue state (Curr_QL) is superior to a previous queue state (Old_QL); if the result is YES, the elephant-flow traffic threshold adjustment circuit 310 performs step S652; if the result is NO, the elephant-flow traffic threshold adjustment circuit 310 performs step S654. In this step, a queue state (e.g., queue length or queuing delay) of the buffer circuit 10 at a current time point is the current queue state, and the queue state of the buffer circuit 10 at a previous time point is the previous queue state.

S644: The elephant-flow traffic threshold adjustment circuit 310 determines whether the current queue state (Curr_QL) is superior to a previous queue state (Old_QL); if the result is YES, the elephant-flow traffic threshold adjustment circuit 310 performs step S654; if the result is NO, the elephant-flow traffic threshold adjustment circuit 310 performs step S656. In this step, a queue state (e.g., queue length or queuing delay) of the buffer circuit 10 at a current time point is the current queue state, and the queue state of the buffer circuit 10 at a previous time point is the previous queue state.

S652: The elephant-flow traffic threshold adjustment circuit 310 determines that the congestion state gets worse, and therefore performs step S662.

S654: The elephant-flow traffic threshold adjustment circuit 310 determines that the congestion state varies insignificantly, and therefore performs step S664.

S656: The elephant-flow traffic threshold adjustment circuit 310 keeps the elephant-flow traffic threshold unchanged.

S662: The elephant-flow traffic threshold adjustment circuit 310 lowers the elephant-flow traffic threshold by an adjustment value. For example, since step S662 is on the premise that the congestion state gets worse (i.e., step S652) and step S664 is on the premise that the congestion state varies insignificantly (i.e., step S654), the adjustment value applied in step S662 can be greater than the adjustment value applied in step S664.

S664: The elephant-flow traffic threshold adjustment circuit 310 lowers the elephant-flow traffic threshold by an adjustment value.

In an exemplary implementation, the adjustment values (Rate_adj) mentioned in the steps S662 and S664 of FIG. 6 can be determined according to the following equation:

$$\text{Rate\_adj} = A \times (\text{Curr\_QL} - \text{Target\_QL}) + B \times (\text{Curr\_QL} - \text{Old\_QL})$$

In the above equation, the "A" and "B" are constants determined according to the demand for implementation, and used for increasing or decreasing the degree of the adjustment in the elephant-flow traffic threshold (ELE_TH) (e.g., ELE_TH=ELE_TH−Rate_adj, wherein ELE_TH is not lower than zero); if both the "A" and "B" are zero, the elephant-flow traffic threshold is kept unchanged. In addition, the adjustment values can vary with the level of the elephant-flow traffic threshold as illustrated with Table 1 below, but the implementation of the present invention is not limited thereto.

TABLE 1

| ELE_TH | Rate_adj |
| --- | --- |
| ELE_TH < 1 Mbps | Rate_adj = Rate_adj/128 |
| ELE_TH < 2 Mbps | Rate_adj = Rate_adj/64 |
| ELE_TH < 4 Mbps | Rate_adj = Rate_adj/32 |
| ELE_TH < 8 Mbps | Rate_adj = Rate_adj/16 |
| ELE_TH < 16 Mbps | Rate_adj = Rate_adj/8 |
| ELE_TH < 32 Mbps | Rate_adj = Rate_adj/4 |
| ELE_TH < 64 Mbps | Rate_adj = Rate_adj/2 |
| ELE_TH ≥ 64 Mbps | Rate_adj = Rate_adj |

Figure 5:
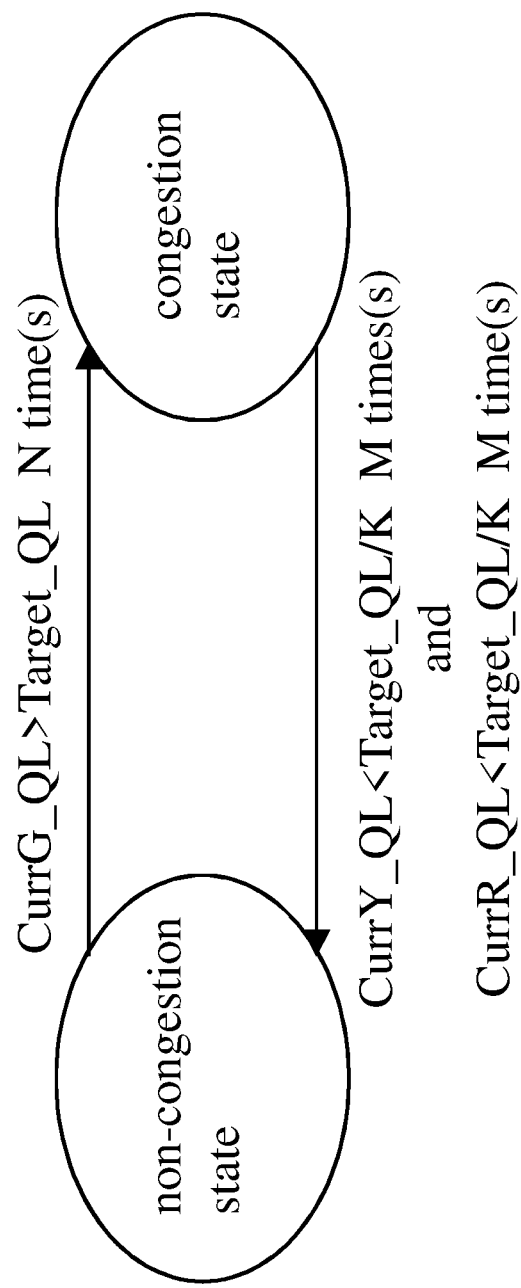
FIG. 5 shows another embodiment of how the elephant-flow traffic threshold adjustment circuit of FIG. 3 determines the state of the buffer circuit.

As mentioned in the preceding paragraph, after the elephant-flow traffic threshold adjustment circuit 310 determines that the buffer circuit 10 returns to the non-congestion state (as shown in FIGS. 4-5), the elephant-flow traffic threshold adjustment circuit 310 raises the elephant-flow traffic threshold. In an exemplary implementation, the elephant-flow traffic threshold is limited to an upper limit; when the elephant-flow traffic threshold fails to reach the upper limit, the elephant-flow traffic threshold (ELE_TH) can be raised according to the following equation:

$$\text{ELE\_TH} = \text{ELE\_TH} \times \left(1 + \frac{1}{64}\right)$$

The above equation is just an example, and those having ordinary skill in the art can modify this equation according to their demand for implementation.

Referring FIGS. 1-3. The classification decision circuit 320 is coupled to the elephant-flow traffic threshold adjustment circuit 310 and the recording circuit 210. The classification decision circuit 320 obtains the traffic information of the multiple data flows from the recording circuit 210, and is configured to determine the classifications of the multiple data flows according to the variation in a relation between the traffic information of the multiple data flows and the elephant-flow traffic threshold; in other words, the classifications of the multiple data flows may vary with the traffic information of the multiple data flows and the elephant-flow traffic threshold. For example, the classification decision circuit 320 calculates the traffic of the first data flow according to the first traffic information of the first data flow (e.g., dividing a packet number/byte number by a period of time, wherein the packet number/byte number is the first traffic information obtained by means of the recording circuit 210 counting the packet number/byte number of the first data flow in the period of time), and then determines whether the traffic of the first data flow is greater than the elephant-flow traffic threshold. On condition that the traffic of the first data flow is greater than the elephant-flow traffic threshold, the classification decision circuit 320 classifies the classification of the first data flow under an elephant flow classification. On condition that the traffic of the first data flow is less than the elephant-flow traffic threshold, the classification decision circuit 320 classifies the classification of the first data flow under a non-elephant flow classification.

Figure 7:
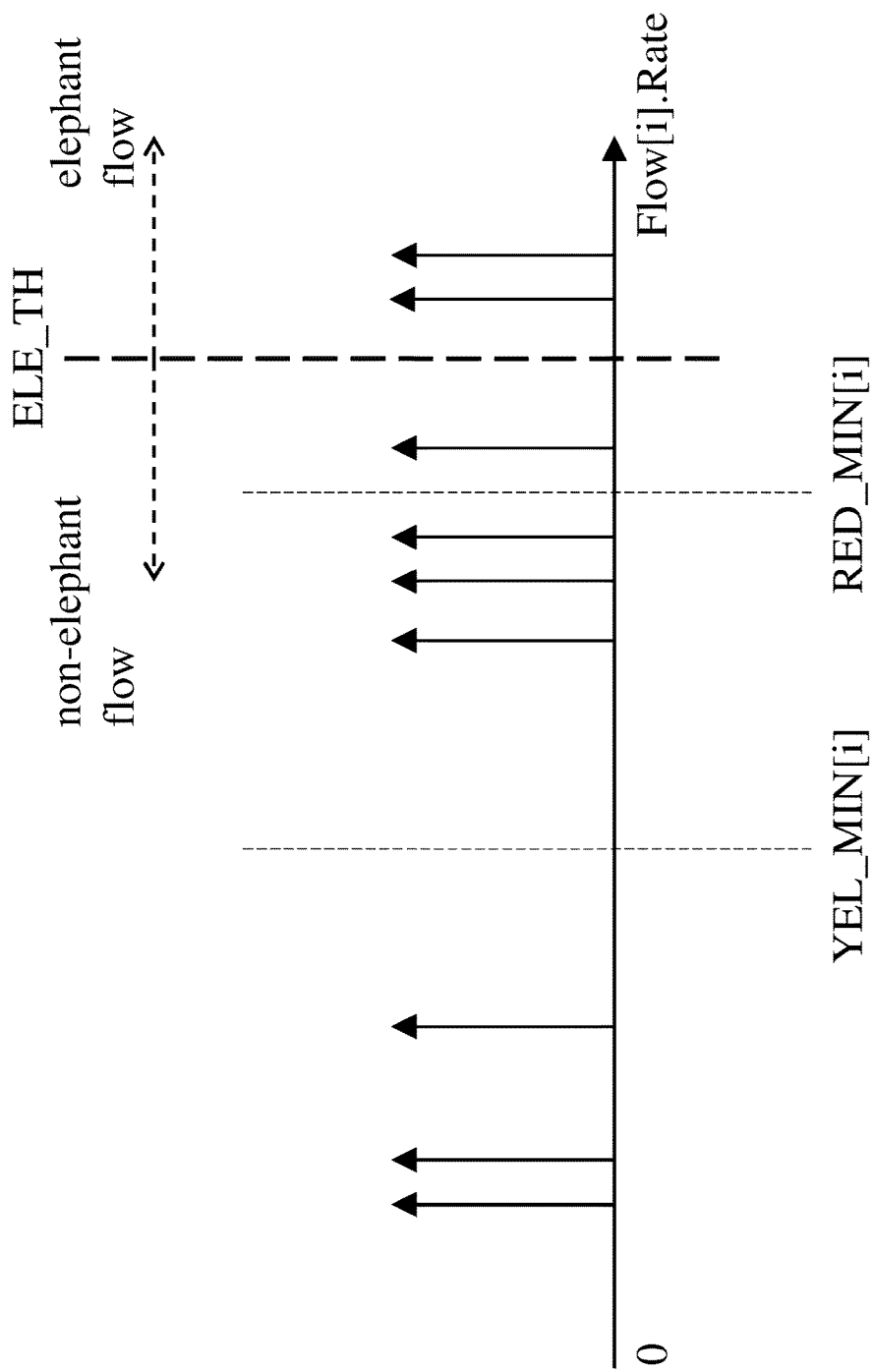
FIG. 7 shows an exemplary implementation of how the classification decision circuit of FIG. 3 determines the classification of the first data flow.

FIG. 7 shows an exemplary implementation of how the classification decision circuit 320 determines the classification of the first data flow, wherein the horizontal axis (Flow[i].Rate) is indicative of the traffic of a data flow and each vertical arrow is indicative of one data flow. As shown in FIG. 7, the elephant-flow traffic threshold is higher than a first threshold (RED_MIN[i]) and thus the classification decision circuit 320 determines that the elephant flow classification is a first classification. Accordingly, on condition that the traffic of the first data flow is higher than the elephant-flow traffic threshold, the classification decision circuit 320 classifies the first data flow under the first classification (i.e., the classification of the two data flows on the right side of the elephant-flow traffic threshold ELE_TH in the figure); and on condition that the traffic of the first data flow is lower than the elephant-flow traffic threshold, the classification decision circuit 320 classifies the first data flow under the non-elephant flow classification (i.e., the classification of the seven data flows on the left side of the elephant-flow traffic threshold ELE_TH in the figure).

Figure 8:
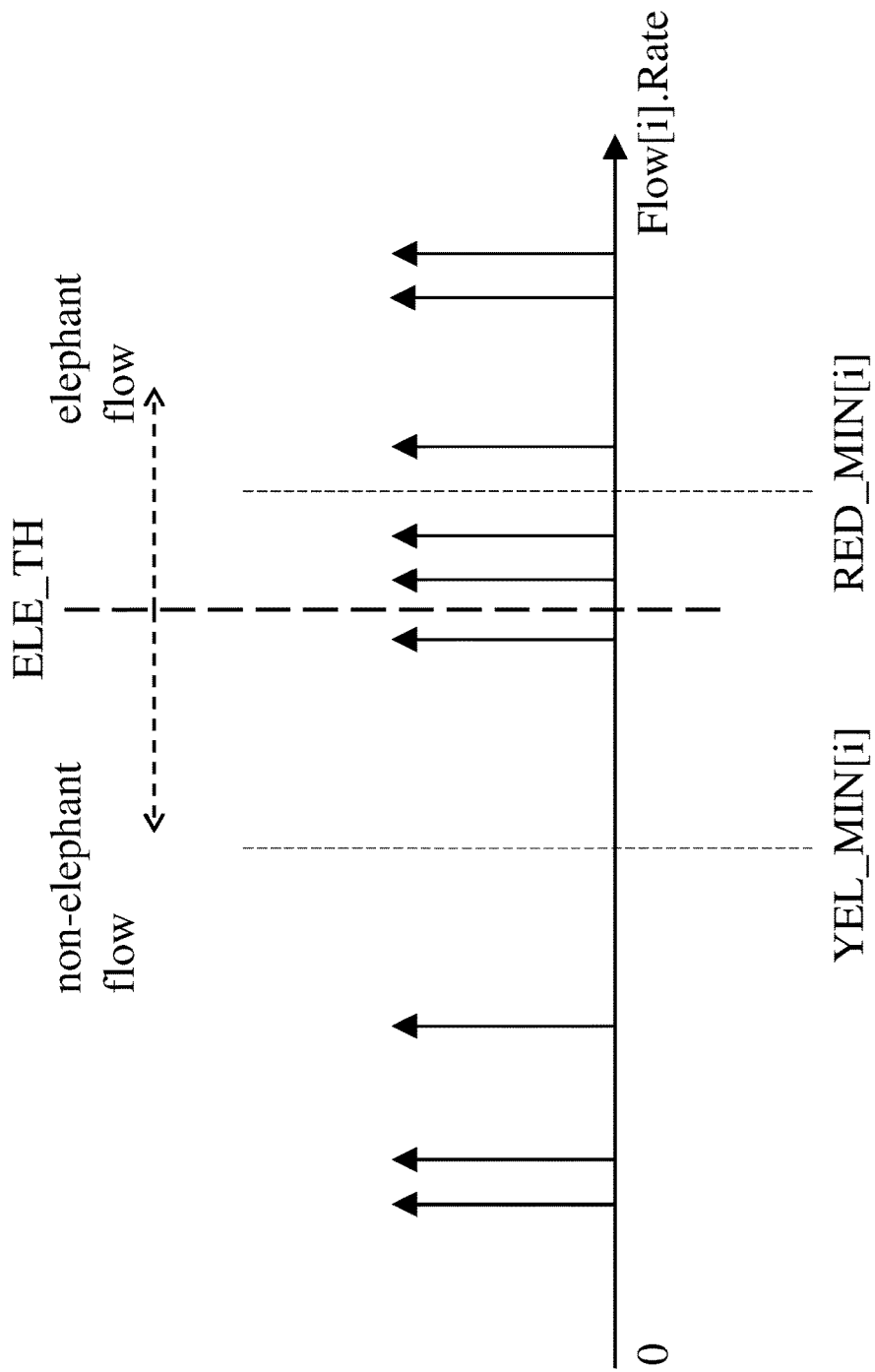
FIG. 8 shows another exemplary implementation of how the classification decision circuit of FIG. 3 determines the classification of the first data flow.

FIG. 8 shows another exemplary implementation of how the classification decision circuit 320 determines the classification of the first data flow. As shown in FIG. 8, the elephant-flow traffic threshold is lower than the first threshold (RED_MIN[i]) but higher than a second threshold (YEL_MIN[i]), wherein the first threshold is higher than the second threshold. Accordingly, the elephant flow classification determined by the classification decision circuit 320 includes a first classification and a second classification. On condition that the traffic of the first data flow is higher than the first threshold (RED_MIN[i]), the classification decision circuit 320 classifies the first data flow under the first classification (i.e., the classification of the three data flows on the right side of the first threshold RED_MIN[i] in the figure); on condition that the traffic of the first data flow is lower than the first threshold (RED_MIN[i]) but higher than the elephant-flow traffic threshold (ELE_TH), the classification decision circuit 320 classifies the first data flow under the second classification (i.e., the classification of the two data flows between the first threshold RED_MIN[i] and the elephant-flow traffic threshold ELE_TH in the figure); and on condition that the traffic of the first data flow is lower than the elephant-flow traffic threshold (ELE_TH), the classification decision circuit 320 classifies the first data flow under the non-elephant flow classification (i.e., the classification of the four data flows on the left side of the elephant-flow traffic threshold ELE_TH in the figure).

Figure 9:
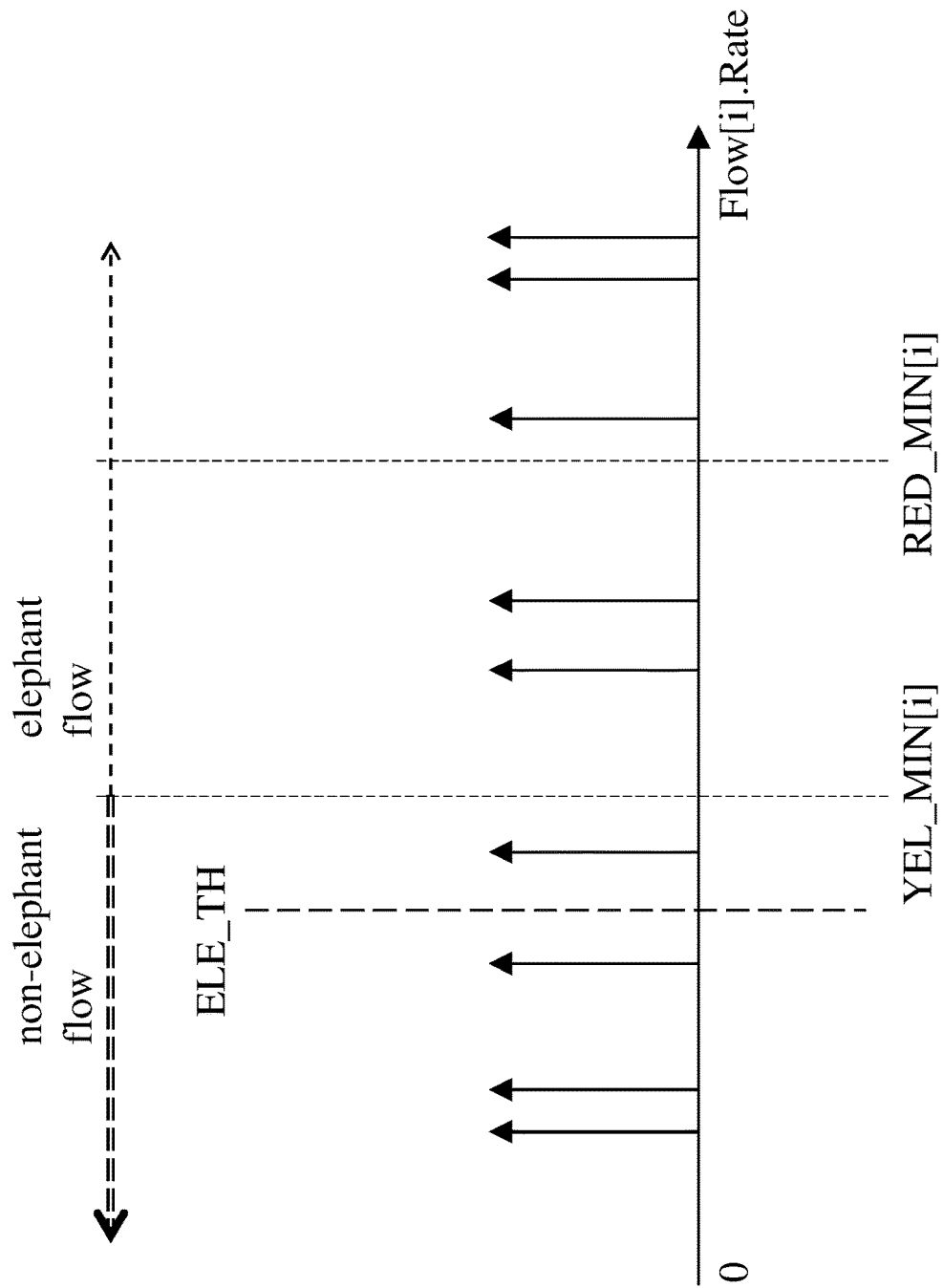
FIG. 9 shows yet another exemplary implementation of how the classification decision circuit of FIG. 3 determines the classification of the first data flow.

FIG. 9 shows yet another exemplary implementation of how the classification decision circuit 320 determines the classification of the first data flow. As shown in FIG. 9, the elephant-flow traffic threshold is lower than the second threshold (YEL_MIN[i]) and thus the elephant flow classification determined by the classification decision circuit 320 includes a first classification and a second classification. On condition that the traffic of the first data flow is higher than the first threshold (RED_MIN[i]), the classification decision circuit 320 classifies the first data flow under the first classification (i.e., the classification of the three data flows on the right side of the first threshold RED_MIN[i] in the figure); on condition that the traffic of the first data flow is lower than the first threshold (RED_MIN[i]) but higher than the second threshold (YEL_MIN[i]) and the elephant-flow traffic threshold (ELE_TH), the classification decision circuit 320 classifies the first data flow under the second classification (i.e., the classification of the two data flows between the first threshold RED_MIN[i] and the second threshold YEL_MIN[i] in the figure); and on condition that the traffic of the first data flow is lower than the second threshold (YEL_MIN[i]), the classification decision circuit 320 classifies the first data flow under the non-elephant flow classification (i.e., the classification of the four data flows on the left side of the second threshold YEL_MIN[i] in the figure) regardless of whether the traffic of the first data flow is higher than the elephant-flow traffic threshold, which implies that when the elephant-flow traffic threshold is adjusted to be lower than the second threshold (YEL_MIN[i]), the second threshold takes the place of the elephant-flow traffic threshold as the threshold for determining whether a data flow is a non-elephant flow and any data flow having a traffic lower than the second threshold is classified under the non-elephant flow classification. It is noted that the setting of the first threshold and/or the setting of the second threshold can be determined according to the demand for classifying data flows, and the first threshold and/or the second threshold can be kept in the classification decision circuit 320 or an external circuit (not shown in the figures) accessible to the classification decision circuit 320.

In an exemplary implementation, the classification decision circuit 320 further determines whether the first data flow belongs to a specific data flow group (e.g., a peer to peer (P2P) data flow group) further according to the identification information of the multiple data flows and the traffic information of the multiple data flows, wherein the specific data flow group can be specified according to the demand for implementation and normally includes a plurality of data flows. For example, the traffic information of the multiple data flows include the packet length information and the packet interval information; if the traffic information of the multiple data flows shows that the average packet length is greater than X bytes (e.g., 500 bytes) and/or the average packet interval time is shorter than Y millisecond (e.g., 1 ms), the classification decision circuit 320 determines that the first data flow belongs to a P2P data flow group, wherein both the X and Y are numbers greater than zero. It is noted that although the above decision is made mainly according to the traffic statistics of data flows, the implementation of the present invention is not limited thereto; for example, the decision may be made according to the packet interval variance and/or other statistics. If the first data flow belongs to the specific data flow group, the classification decision circuit 320 determines the classification of the first data flow according to the total traffic of the specific data flow group (i.e., the sum of the traffic of all data flows included in the specific data flow group) and the elephant-flow traffic threshold; more specifically, even though the traffic of the first data flow is lower than the elephant-flow traffic threshold, if the total traffic of the specific data flow group including the traffic of the first data flow is higher than the elephant-flow traffic threshold, the classification decision circuit 320 determines that the first data flow is an elephant flow, which means that all data flows in the specific data flow group are elephant flows.

Figure 10:
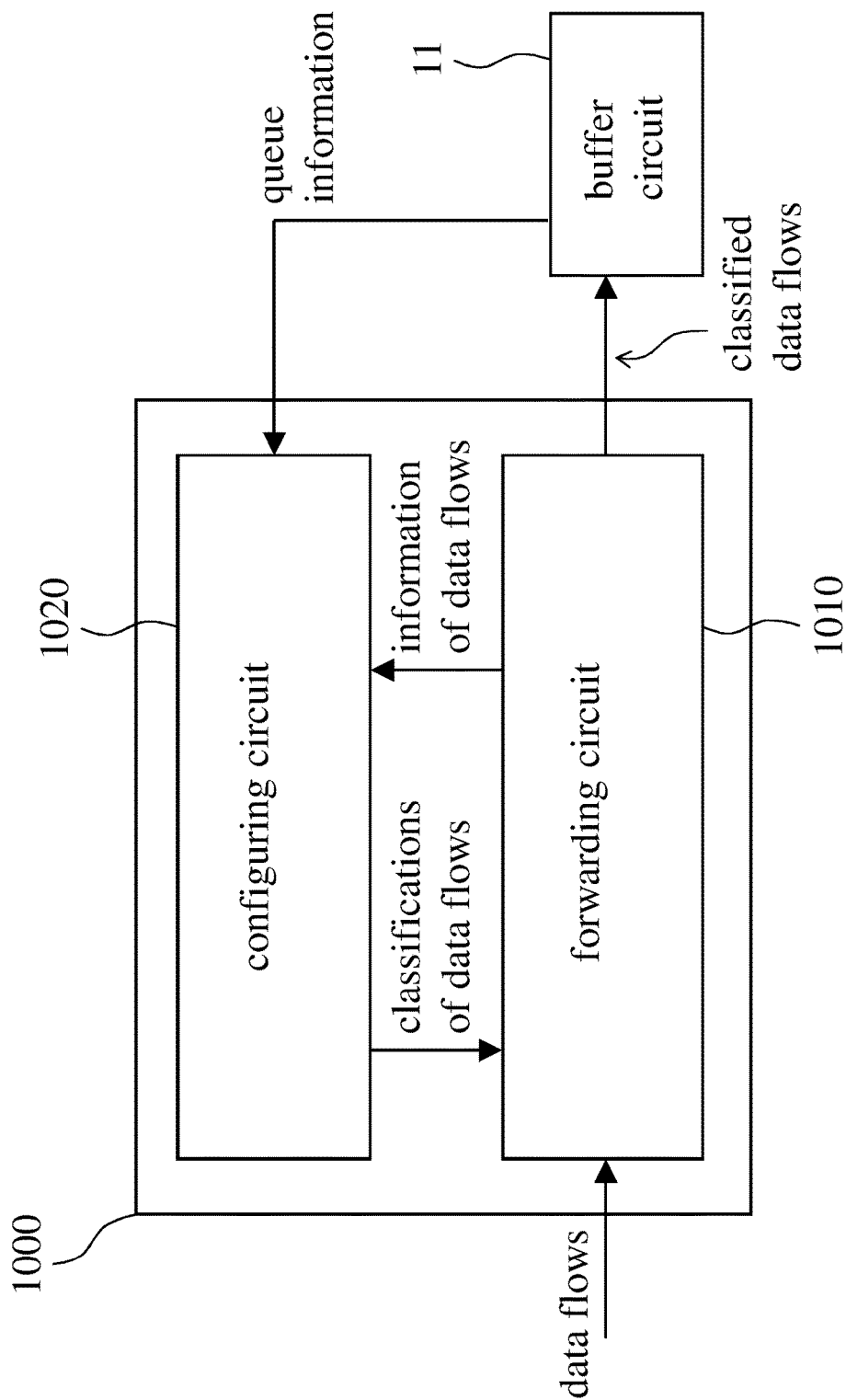
FIG. 10 shows another embodiment of the data flow classification device of the present disclosure.

FIG. 10 shows another embodiment of the data flow classification device of the present disclosure. The data flow classification device 1000 of FIG. 10 includes a forwarding circuit 1010 and a configuring circuit 1020. Each of the forwarding circuit 1010 and the configuring circuit 1020 can be realized with hardware or realized with hardware executing software and/or firmware. In regard to the difference between the embodiment of FIG. 1 and the embodiment of FIG. 10, the forwarding circuit 110 in FIG. 1 includes the function of acquiring the traffic information of a data flow (e.g., packet number/byte number) while the forwarding circuit 1010 in FIG. 10 has no need to include this function; and the configuring circuit 120 in FIG. 1 doesn't need to record the traffic information of a data flow (e.g., the serial number of a packet and the reception time of this packet) while the configuring circuit 1020 in FIG. 10 includes this recording function. In brief, the configuring circuit 120 in FIG. 1 is relatively simple while the forwarding circuit 1010 in FIG. 10 is relatively simple, so that those implementing the present invention can choose the configuration of FIG. 1 or FIG. 10 according to their demand. It is noted that people having ordinary skill in the art can appreciate the detail and modification of the embodiment of FIG. 10 according to the disclosure of the embodiment of FIG. 1, which means that the features of the embodiment of FIG. 1 can be applied to the embodiment of FIG. 10 in a logical way; therefore, the repeated and redundant descriptions are omitted here.

Figure 11:
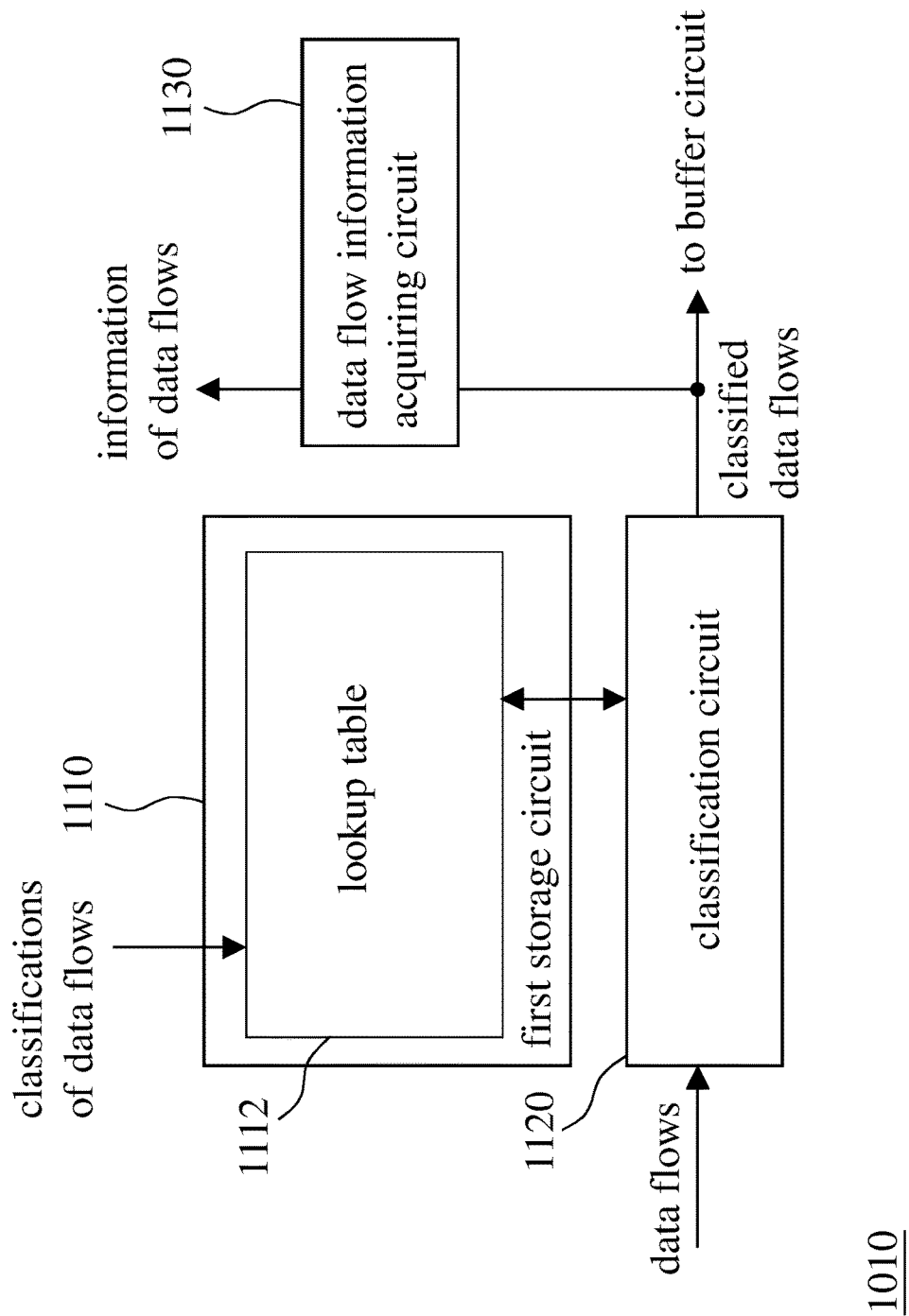
FIG. 11 shows an embodiment of the forwarding circuit of FIG. 10.

FIG. 11 shows an embodiment of the forwarding circuit 1010 of FIG. 10. The forwarding circuit 1010 of FIG. 11 includes a first storage circuit 1110, a classification circuit 1120, and a data flow information acquiring circuit 1130. The first storage circuit 1110 and the classification circuit 1120 may be integrated into one lookup table circuit (not shown in the figure), but the implementation of the present invention is not limited thereto.

Referring to FIGS. 10-11. The first storage circuit 1110 is configured to store a lookup table 1112 which stores the identification information of multiple data flows and the classifications of the multiple data flows. In an exemplary implementation, the identification information of each of the multiple data flows is a set of values such as the aforementioned 5-tuple, but the implementation of the present invention is not limited thereto. Providing an implementation of the present invention is practicable, any information that can be used as the identification of a data flow can be the identification information in this implementation.

Referring to FIGS. 10-11. The classification circuit 1120 is coupled with a data flow input (i.e., the source of the arrow labeled with "data flows" in the figures) and the first storage circuit 1110, and configured to receive a first data flow from the data flow input and search the identification information of the multiple data flows in the lookup table 1112 for the first identification information of the first data flow, wherein the first data flow can be any data flow received from the data flow input. The classification circuit 1120 may search the information in the lookup table 1112 in a way the same as (or similar to) the classification circuit 220 of FIG. 2 searching the information in the lookup table 212. On condition that the first identification information is included in the lookup table 1112, the classification circuit 1120 determines the classification of the first data flow according to the classifications of the multiple data flows stored in the lookup table 1112, and then outputs the first data flow to a buffer circuit 11, and the classification circuit 1120 may determine the classification of the first data flow in a way the same as (or similar to) the classification circuit 220 of FIG. 2 determining the classification of the first data flow. On condition that the first identification information is not included in the lookup table 1112, the classification circuit 1120 treats the classification of the first data flow as a predetermined classification (e.g., non-elephant flow classification), and then outputs the first data flow to the buffer circuit 11. It is noted that the buffer circuit 11 can be integrated into the data flow classification device 1000 or independent of the data flow classification device 1000.

In an exemplary implementation, the classifications of the multiple data flows stored in the lookup table 1112 are the same as (or similar to) the classifications of the multiple data flows (i.e., the elephant flow classification and the non-elephant flow classification included in the classifications of the multiple data flows) stored in the lookup table 212 of FIG. 2, and the buffer circuit 11 is the same as (or similar to) the buffer circuit 10 and is capable of assigning different transmission priorities or discard rates to data flows classified under different classifications. In an exemplary implementation, on condition that the first identification of the first data flow is included in the lookup table 1112, the classification of the first data flow will be included in the lookup table 1112 logically; accordingly, the classification circuit 1120 can tag each packet of the first data flow according to the classification of the first data flow stored in the lookup table 1112, so that the buffer circuit 11 can learn of the classification of each packet according to its tag.

Referring to FIGS. 10-11. The data flow information acquiring circuit 1130 is configured to acquire at least a part of the first data flow from the data flow input or the output of the classification circuit 1120, so as to obtain and output the first identification of the first data flow (e.g., the aforementioned 5-tuple). It is noted that in this embodiment, the data flow information acquiring circuit 1130 acquires the at least a part of the first data flow regardless of whether the lookup table 1112 includes the first identification information. In an exemplary implementation, the data flow information acquiring circuit 1130 performs a sample operation according to a predetermined probability in order to obtain the at least a part of the first data flow, and thereby obtains the first identification and traffic information of the first data flow; in other words, a probability of the data flow information acquiring circuit 1130 obtaining the at least a part of the first data flow is equal to the predetermined probability. In light of the above, the data flow information acquiring circuit 1130 may miss some packets of the first data flow.

Figure 12:
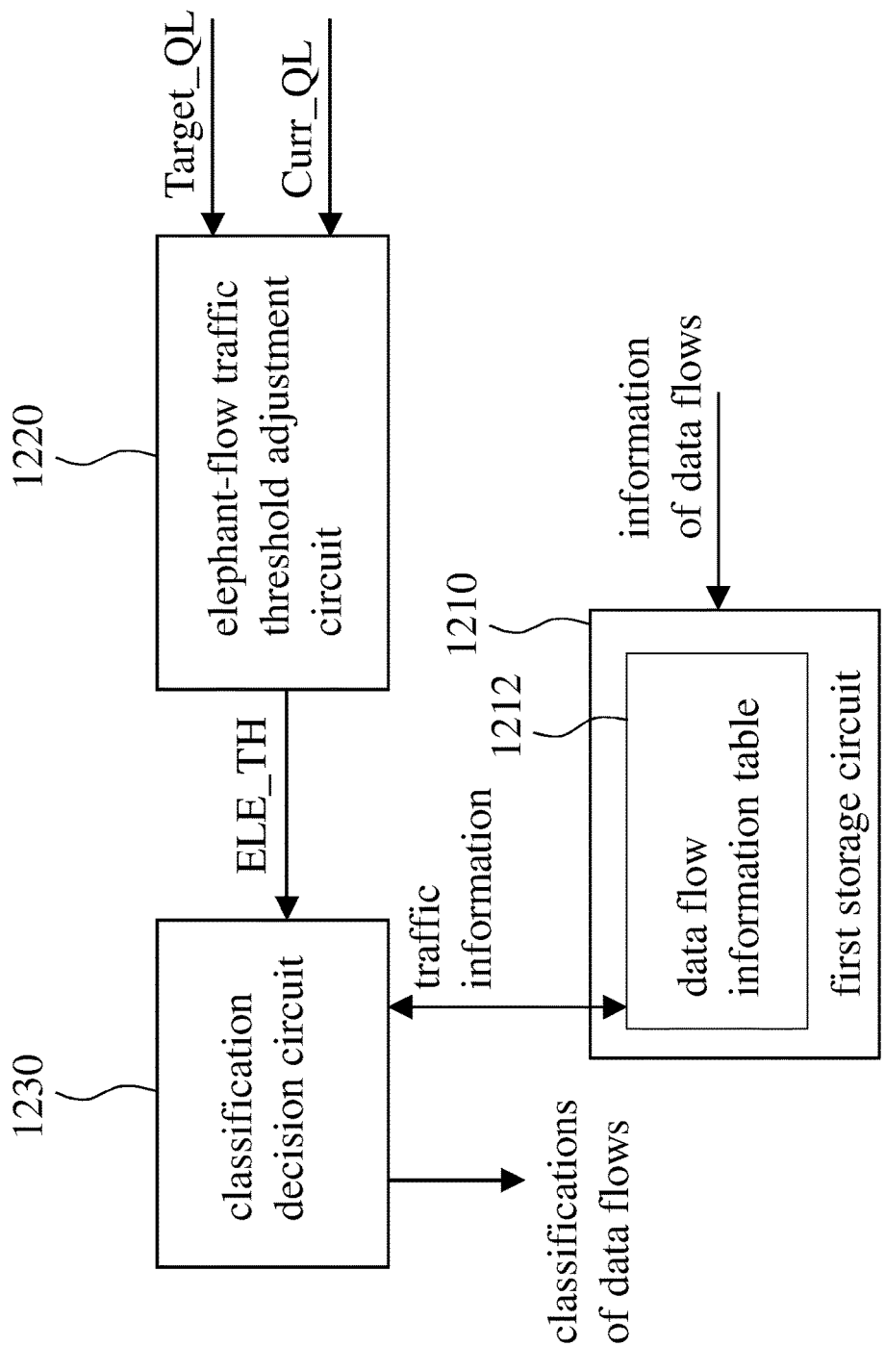
FIG. 12 shows an embodiment of the configuring circuit of FIG. 10.

FIG. 12 shows an embodiment of the configuring circuit 1020 of FIG. 10. The configuring circuit 1020 of FIG. 12 includes a second storage circuit 1210, an elephant-flow traffic threshold adjustment circuit 1220, and a classification decision circuit 1230.

Referring to FIGS. 10-12. The second storage circuit 1210 is coupled to the data flow information acquiring circuit 1130, and configured to store a data flow information table 1212 which stores the identification and traffic information of the multiple data flows from the data flow information acquiring circuit 1130, in which the identification information of the multiple data flows includes the first identification information and the traffic information of the multiple data flows includes the first traffic information.

Referring to FIGS. 10-12. The elephant-flow traffic threshold adjustment circuit 1220 is coupled to the buffer circuit 11, and configured to determine an elephant-flow traffic threshold according to the variation in a relation between a target queue state (e.g., constant queue length or constant queuing delay) and a current queue state (e.g., variable queue length or variable queuing delay) of the buffer circuit 11. An embodiment of the elephant-flow traffic threshold adjustment circuit 1220 is the same as (or similar to) the elephant-flow traffic threshold adjustment circuit 310 of FIG. 3, and the detail is found in FIG. 3-6 and the description thereof.

Referring to FIGS. 10-12. The classification decision circuit 1230 is coupled to the elephant-flow traffic threshold adjustment circuit 1220, the second storage circuit 1210, and the first storage circuit 1110. The classification decision circuit 1230 is configured to determine the classifications of the multiple data flows stored in the lookup table 1112 of the first storage circuit 1110 according to the variation in a relation between the traffic information of the multiple data flows and the elephant-flow traffic threshold. For example, the classification decision circuit 1230 calculates the traffic of the first data flow according to the first traffic information of the first data flow stored in the data flow information table 1212, then determines the classification of the first data flow according to the traffic of the first data flow and the elephant-flow traffic threshold, and accordingly updates the classification of the first data flow in the lookup table 1112. The classification decision circuit 1230 determines the classification of the first data flow in a way the same as (or similar to) the classification decision circuit 320 determining the classification of the first data flow.

In an exemplary implementation, when a packet protocol of the first data flow is Transmission Control Protocol (TCP), the data flow information acquiring circuit 1130 performs a sample operation according to a predetermined probability so as to obtain two packets of the first data flow including a previous packet and a current packet; afterward, the classification decision circuit 1230 learns the traffic of the first data flow according to the serial numbers of the two packets and the time points of sampling the two packets. For example, the serial number of the previous packet (Pre_SN) and the time point of sampling the previous packet (Pre_Time) are recorded and kept in the second storage circuit 1210, the serial number of the current packet (Cur_SN) and the time point of sampling the current packet (Cur_Time) are provided by the data flow information acquiring circuit 1130 in realtime, and the classification decision circuit 1230 divides the difference between the two serial numbers (deltaSN=Cur_SN−Pre_SN) by the time interval between the time points of sampling the two packets (deltaTime=Cur_Time−Pre_Time) to obtain the traffic of the first data flow (Flow[i].rate), which can be expressed with the following equation:

$$\text{Flow}[i].\text{rate} = \frac{\text{deltaSN}}{\text{deltaTime}}$$

It is noted that the serial number of the latest packet and the time point of sampling the latest packet provided by the data flow information acquiring circuit 1130 will be used to update (or replace) the serial number of the previous packet and the time point of sampling the previous packet respectively.

In an exemplary implementation, when a packet protocol of the first data flow is not TCP, the data flow information acquiring circuit 1130 performs a sample operation according to a predetermined probability so as to obtain two packets of the first data flow including a previous packet and a current packet; afterward, the classification decision circuit 1230 learns the traffic of the first data flow according to the length of the current packet, the predetermined probability, and the time points of sampling the two packets. For example, the time point of sampling the previous packet (Pre_Time) is recorded and stored in the second storage circuit 1210, the time point of sampling the current packet (Cur_Time) and the length of the current packet (Cur_Length) are provided by the data flow information acquiring circuit 1130 in realtime, and the classification decision circuit 1230 divides the length of the current packet by the predetermined probability (P %) to obtain a value and then divides the value by the interval between the time points of sampling the two packets (deltaTime=Cur_Time−Pre_Time) to estimate the traffic of the first data flow (Flow[i].rate), which can be expressed with the following equation:

$$\text{Flow}[i].\text{rate} = \frac{\frac{\text{Cur\_Length}}{P\%}}{\text{deltaTime}}$$

In an exemplary implementation, the classification decision circuit 1230 can determine whether the first data flow belongs to a specific data flow group (e.g., peer to peer (P2P) data flow group) according to the identification information of the multiple data flows and the traffic information of the multiple data flows. The classification decision circuit 1230 can determine whether the first data flow belongs to a specific data flow group in a way the same as (or similar to) that applied to the classification decision circuit 320.

It is noted that people of ordinary skill in the art can selectively use some or all of the features of any embodiment in this specification or selectively use some or all of the features of multiple embodiments in this specification to implement the present invention as long as such implementation is practicable; in other words, the present invention can be implemented flexibly in accordance with the present disclosure.

To sum up, the data flow classification device of the present disclosure can classify multiple data flows according to the comparison between the traffic of the multiple data flows and an elephant-flow traffic threshold, and can prevent the problems of the prior art.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A data flow classification device, comprising:
a forwarding circuit including:
a first storage circuit configured to store a lookup table which stores identification information of multiple data flows and classifications of the multiple data flows;
a classification circuit coupled with a data flow input and the first storage circuit, the classification circuit configured to receive a first data flow from the data flow input and search the identification information of the multiple data flows in the lookup table for first identification information of the first data flow, on condition that the first identification information is included in the lookup table, the classification circuit determining classification of the first data flow according to the classifications of the multiple data flows included in the lookup table and outputting the first data flow to a buffer circuit, and on condition that the first identification information is not included in the lookup table, the classification circuit treating the classification of the first data flow as a predetermined classification and outputting the first data flow to the buffer circuit; and
a data flow information acquiring circuit configured to acquire at least a part of the first data flow to obtain the first identification information and first traffic information of the first data flow; and
a configuring circuit including:
a second storage circuit coupled to the data flow information acquiring circuit, the second storage circuit configured to store a data flow information table which stores the identification information of the multiple data flows and traffic information of the multiple data flows, in which the identification information of the multiple data flows includes the first identification information and the traffic information of the multiple data flows includes the first traffic information;
an elephant-flow traffic threshold adjustment circuit coupled to the buffer circuit, the elephant-flow traffic threshold adjustment circuit configured to determine an elephant-flow traffic threshold according to a variation in a relation between a target queue state and a current queue state of the buffer circuit; and
a classification decision circuit coupled to the elephant-flow traffic threshold adjustment circuit, the second storage circuit, and the first storage circuit, the classification decision circuit configured to determine the classifications of the multiple data flows stored in the lookup table of the first storage circuit according to a variation in a relation between the traffic information of the multiple data flows and the elephant-flow traffic threshold,
wherein the classifications of the multiple data flow stored in the lookup table include an elephant flow classification and a non-elephant flow classification; traffic of any data flow classified under the elephant flow classification is higher than traffic of any data flow classified under the non-elephant flow classification; an elephant flow transmission priority assigned to the elephant flow classification is lower than a non-elephant flow transmission priority assigned to the non-elephant flow classification, or an elephant flow packet discard rate in connection with the elephant flow classification is higher than a non-elephant flow packet discard rate in connection with the non-elephant flow classification; and the predetermined classification is the non-elephant flow classification.

2. The data flow classification device of claim 1, wherein the identification information of each of the multiple data flows includes: a destination Internet Protocol (IP) address; a source IP address; a protocol; a destination port; and a source port.

3. The data flow classification device of claim 1, wherein each packet of the first data flow includes the first identification information; the classification circuit is configured to search the identification information of the multiple data flows in the lookup table for the first identification information; and on condition that the first identification information is included in the lookup table, the classification of the first data flow relevant to the first identification information is included in the lookup table, and thus the classification circuit tags each packet of the first data flow with the classification of the first data flow stored in the lookup table.

4. The data flow classification device of claim 1, wherein the target queue state and the current queue state are indicative of a target queue length and a current queue length respectively, or the target queue state and the current queue state are indicative of a target queue queuing delay and a current queue queuing delay respectively.

5. The data flow classification device of claim 1, wherein the elephant flow classification includes a first classification and a second classification; traffic of any data flow classified under the first classification is higher than traffic of any data flow classified under the second classification; and a first transmission priority assigned to the first classification is lower than a second transmission priority assigned to the second classification, or a first packet discard rate in connection with the first classification is higher than a second packet discard rate in connection with the second classification.

6. A data flow classification device, comprising:
a forwarding circuit including:
a first storage circuit configured to store a lookup table which stores identification information of multiple data flows and classifications of the multiple data flows;
a classification circuit coupled with a data flow input and the first storage circuit, the classification circuit configured to receive a first data flow from the data flow input and search the identification information of the multiple data flows in the lookup table for first identification information of the first data flow, on condition that the first identification information is included in the lookup table, the classification circuit determining classification of the first data flow according to the classifications of the multiple data flows included in the lookup table and outputting the first data flow to a buffer circuit, and on condition that the first identification information is not included in the lookup table, the classification circuit treating the classification of the first data flow as a predetermined classification and outputting the first data flow to the buffer circuit; and
a data flow information acquiring circuit configured to acquire at least a part of the first data flow to obtain the first identification information and first traffic information of the first data flow; and
a configuring circuit including:
a second storage circuit coupled to the data flow information acquiring circuit, the second storage circuit configured to store a data flow information table which stores the identification information of the multiple data flows and traffic information of the multiple data flows, in which the identification information of the multiple data flows includes the first identification information and the traffic information of the multiple data flows includes the first traffic information;

an elephant-flow traffic threshold adjustment circuit coupled to the buffer circuit, the elephant-flow traffic threshold adjustment circuit configured to determine an elephant-flow traffic threshold according to a variation in a relation between a target queue state and a current queue state of the buffer circuit; and a classification decision circuit coupled to the elephant-flow traffic threshold adjustment circuit, the second storage circuit, and the first storage circuit, the classification decision circuit configured to determine the classifications of the multiple data flows stored in the lookup table of the first storage circuit according to a variation in a relation between the traffic information of the multiple data flows and the elephant-flow traffic threshold, wherein the data flow information acquiring circuit performs a sample operation according to a predetermined probability to obtain the at least a part of the first data flow, and thereby obtains the first identification information and the first traffic information.

7. A data flow classification device, comprising:

a forwarding circuit including:
  a first storage circuit configured to store a lookup table which stores identification information of multiple data flows and classifications of the multiple data flows;
  a classification circuit coupled with a data flow input and the first storage circuit, the classification circuit configured to receive a first data flow from the data flow input and search the identification information of the multiple data flows in the lookup table for first identification information of the first data flow, on condition that the first identification information is included in the lookup table, the classification circuit determining classification of the first data flow according to the classifications of the multiple data flows included in the lookup table and outputting the first data flow to a buffer circuit, and on condition that the first identification information is not included in the lookup table, the classification circuit treating the classification of the first data flow as a predetermined classification and outputting the first data flow to the buffer circuit; and
  a data flow information acquiring circuit configured to acquire at least a part of the first data flow to obtain the first identification information and first traffic information of the first data flow; and a configuring circuit including:
  a second storage circuit coupled to the data flow information acquiring circuit, the second storage circuit configured to store a data flow information table which stores the identification information of the multiple data flows and traffic information of the multiple data flows, in which the identification information of the multiple data flows includes the first identification information and the traffic information of the multiple data flows includes the first traffic information;
  an elephant-flow traffic threshold adjustment circuit coupled to the buffer circuit, the elephant-flow traffic threshold adjustment circuit configured to determine an elephant-flow traffic threshold according to a variation in a relation between a target queue state and a current queue state of the buffer circuit; and
  a classification decision circuit coupled to the elephant-flow traffic threshold adjustment circuit, the second storage circuit, and the first storage circuit, the classification decision circuit configured to determine the classifications of the multiple data flows stored in the lookup table of the first storage circuit according to a variation in a relation between the traffic information of the multiple data flows and the elephant-flow traffic threshold, wherein after the current queue state is superior to the target queue state N time(s), the elephant-flow traffic threshold adjustment circuit determines that the buffer circuit is in a congestion state, and lower the elephant-flow traffic threshold at least one time; and the N is a positive integer.

8. The data flow classification device of claim 7, wherein a queue state of the buffer circuit at a current time point is the current queue state; the queue state of the buffer circuit at a previous time point is a previous queue state; the queue state of the buffer circuit is a queue length or a queuing delay; in a circumstance that the buffer circuit is in the congestion state, when the current queue state is superior to the target queue state, the elephant-flow traffic threshold adjustment circuit lowers the elephant-flow traffic threshold further according to a variation in a relation between the current queue state and the previous queue state.

9. The data flow classification device of claim 8, wherein in the circumstance that the buffer circuit is in the congestion state, when the current queue state is superior to each of the target queue state and the previous queue state, the elephant-flow traffic threshold adjustment circuit lowers the elephant-flow traffic threshold by a first degree, when the current queue state is superior to the target queue state but inferior to the previous queue state, the elephant-flow traffic threshold adjustment circuit lowers the elephant-flow traffic threshold by a second degree; and the first degree is greater than the second degree.

10. The data flow classification device of claim 7, wherein a queue state of the buffer circuit at a current time point is the current queue state; the queue state of the buffer circuit at a previous time point is a previous queue state; the queue state of the buffer circuit is a queue length or a queuing delay; in a circumstance that the buffer circuit is in the congestion state, when the current queue state is inferior to the target queue state, the elephant-flow traffic threshold adjustment circuit lowers or maintains the elephant-flow traffic threshold further according to a variation in a relation between the current queue state and the previous queue state.

11. The data flow classification device of claim 10, wherein in the circumstance that the buffer circuit is in the congestion state, when the current queue state is inferior to the target queue state but superior to the previous queue state, the elephant-flow traffic threshold adjustment circuit lowers the elephant-flow traffic threshold, and when the current queue state is inferior to each of the target queue state and the previous queue state, the elephant-flow traffic threshold adjustment circuit maintains the elephant-flow traffic threshold.

12. The data flow classification device of claim 7, wherein after the current queue state is inferior to one-K" of the target queue state M time(s), the elephant-flow traffic threshold adjustment circuit determines that the buffer circuit is in a non-congestion state, and raises the elephant-flow traffic threshold at least one time; and both the K and the M are positive integers.

13. The data flow classification device of claim 7, wherein the buffer circuit includes a non-elephant flow buffer queue and at least one elephant flow buffer queue; the current queue state is a queue state of the non-elephant flow buffer queue; a non-elephant flow transmission priority assigned to the non-elephant flow buffer queue is higher than any elephant flow transmission priority assigned to the at least one elephant flow buffer queue, or a non-elephant flow packet discard rate in connection with the non-elephant flow buffer queue is lower than any elephant flow packet discard rate in connection with the at least one elephant flow buffer queue; after each elephant-flow current queue state of the least one elephant flow buffer queue is inferior to one-Kth of the target queue state M time(s), the elephant-flow traffic threshold adjustment circuit determines that the buffer circuit is in a non-congestion state, and raises the elephant-flow traffic threshold at least one time; and both the K and the M are positive integers.

14. The data flow classification device of claim 1, wherein on condition that the classification decision circuit determines that traffic of the first data flow is higher than the elephant-flow traffic threshold according to the first traffic information, the classification decision circuit determines that the classification of the first data flow is the elephant flow classification; and on condition that the classification decision circuit determines that the traffic of the first data flow is lower than the elephant-flow traffic threshold according to the first traffic information, the classification decision circuit determines that the classification of the first data flow is the non-elephant flow classification.

15. The data flow classification device of claim 14, wherein when the elephant-flow traffic threshold is higher than a first threshold, the elephant flow classification is a first classification; when the elephant-flow traffic threshold is lower than the first threshold but higher than a second threshold, the elephant flow classification includes the first classification and a second classification; when the elephant-flow traffic threshold is between the first threshold and the second threshold, if the classification decision circuit determines that the traffic of the first data flow is higher than the first threshold, the classification decision circuit determines that the classification of the first data flow is the first classification; when the elephant-flow traffic threshold is between the first threshold and the second threshold, if the classification decision circuit determines that the traffic of the first data flow is lower than the first threshold but higher than the elephant-flow traffic threshold, the classification decision circuit determines that the classification of the first data flow is the second classification; and
when the elephant-flow traffic threshold is between the first threshold and the second threshold, if the classification decision circuit determines that the traffic of the first data flow is lower than the elephant-flow traffic threshold, the classification decision circuit determines that the classification of the first data flow is the non-elephant flow classification.

16. The data flow classification device of claim 14, wherein the data flow information acquiring circuit performs a sample operation according to a predetermined probability to obtain two packets of the first data flow; when a packet transmission protocol of the first data flow is Transmission Control Protocol (TCP), the classification decision circuit determines the traffic of the first data flow according to serial numbers of the two packets and time points of sampling the two packets.

17. The data flow classification device of claim 14, wherein the data flow information acquiring circuit performs a sample operation according to a predetermined probability to obtain two packets of the first data flow including a previous packet and a current packet;
when a packet transmission protocol of the first data flow is not Transmission Control Protocol (TCP), the classification decision circuit determines the traffic of the first data flow according to a packet length of the current packet, the predetermined probability, and time points of sampling the two packets.

18. The data flow classification device of claim 1, wherein the classification decision circuit is configured to determine whether the first data flow belongs to a specific data flow group according to the identification information of the multiple data flows and the traffic information of the multiple data flows; and when the first data flow belongs to the specific data flow group, the classification decision circuit determines the classification of the first data flow according to total traffic of the specific data flow group and the elephant-flow traffic threshold.

19. The data flow classification device of claim 18, wherein the traffic information of the multiple data flows includes packet length information and packet interval information.

* * * * *